Aug. 23, 1927.
S. D. NESMITH
1,640,048
ELECTRICALLY OPERATED WATER HEATER
Filed May 19, 1926    2 Sheets-Sheet 2
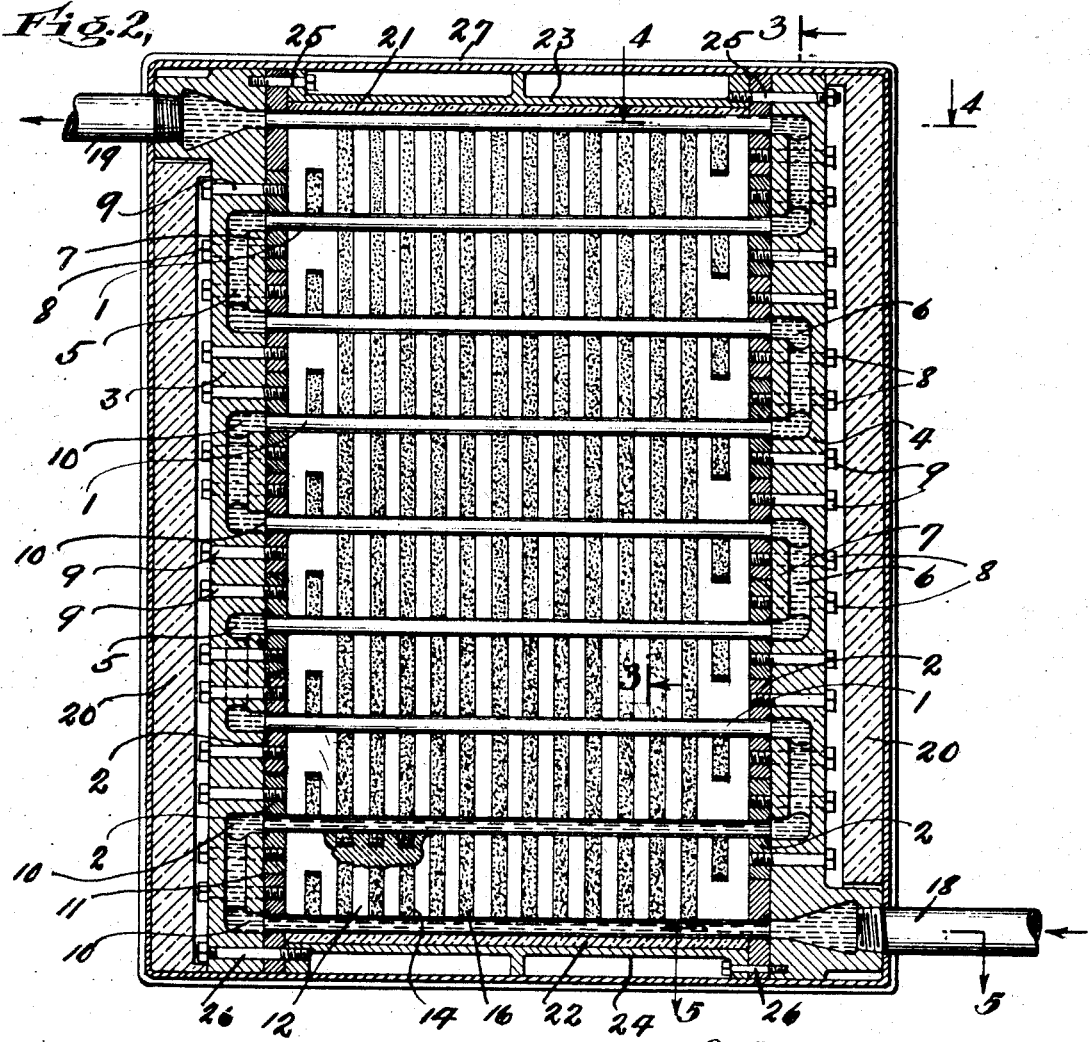
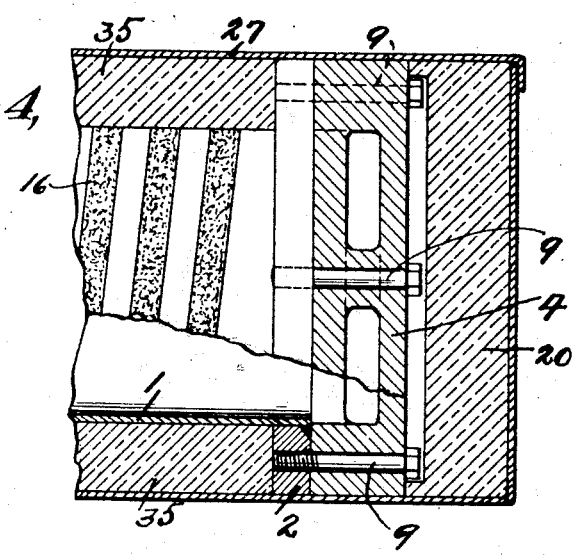
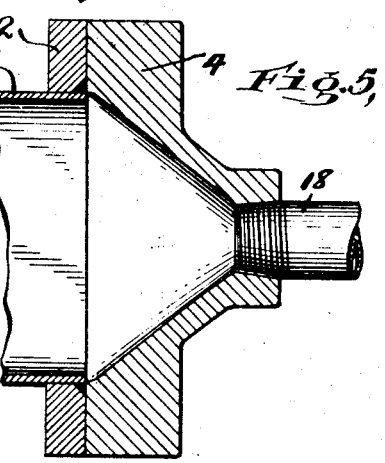
INVENTOR
Samuel D. Nesmith
BY
Kiddle and Margeson
ATTORNEYS.

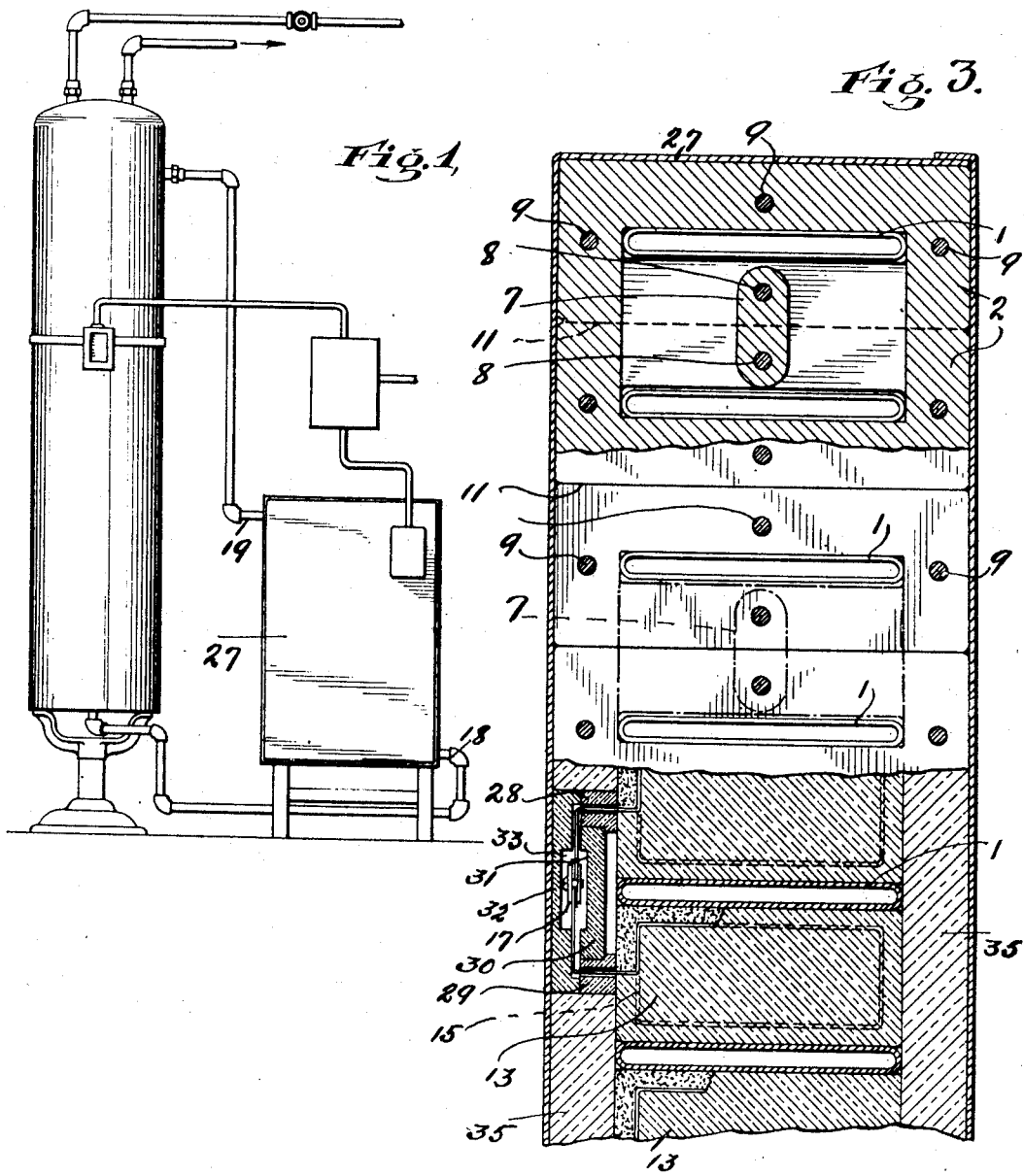

Patented Aug. 23, 1927.

1,640,048

UNITED STATES PATENT OFFICE.

SAMUEL D. NESMITH, OF SAN DIEGO, CALIFORNIA, ASSIGNOR OF PART INTEREST TO GEORGE H. SCHMIDT, WALTER C. STITT, F. F. GRANT, H. M. SAMMIS, PAUL J. HARTLEY, AND R. C. EASOM.

ELECTRICALLY-OPERATED WATER HEATER.

Application filed May 19, 1926. Serial No. 110,073.

My invention relates to an improvement in electrically operated water heaters, and it has for one of its objects the provision of an electrically operated water heater adapted to be connected to a tank of water whereby the water will be caused to circulate through the apparatus and be heated thereby, my apparatus, however, being located at the exterior of the tank containing the water to be heated, as distinguished from the immersion type of heater, wherein the heating element is located directly in the water. This arrangement is of material advantage as compared with the immersion type of heater in that it is not subjected to the corroding effect of the water, and the danger of charging the water with the power employed for operating the device is reduced to a minimum.

A still further object of my invention is to provide an electrically operated water heater of the character above indicated, wherein I employ a series of flattened water tubes of high heat conductivity, these tubes being arranged in spaced relation to each other, electrical heating elements independently removable being interposed between adjacent tubes. These heating elements, I may say, are of the proper shape and size to substantially fill the space between adjacent tubes so as to reduce to a minimum, in fact, practically eliminate, air spaces between the heating elements and the tubes, thereby promoting efficiency in the operation of the device, both as to method of application of the heat to the water and the amount of current consumed.

A still further object of my invention is the provision of an apparatus such as above outlined, in which the water tubes are provided at each end with an annular flange, each tube preferably being composed of thin-walled flattened copper tubing, the annular flanges being welded thereto. This provides an arrangement wherein, so far as heating is concerned, most efficient operation is obtained. The tubes are also removably secured in position, thereby rendering the tubes accessible for removal and replacement, each tube, it being understood, being removable independently of all the others.

Another and further object of my invention is the provision of an electrically operated water heater in which the thin-walled water tubes of high heat conductivity are series connected, so that the water circulating through the apparatus will be constrained to flow in a zig-zag or tortuous path, and for this reason be thoroughly heated as it emerges from the apparatus and is returned to the tank. This, it will be seen, insures a constant circulation of the water from the tank to the heater and back to the tank again, due to temperature changes in the water. If desired, a thermostatic control may be employed so as to open the electric circuit of the apparatus after the temperature of the water has reached a predetermined point.

A still further object of my invention is the provision of an electrically operated water heater in which the water tubes are disposed horizontally and are independently attached, as by bolting, to a pair of spaced headers, each header being of unitary or integral construction and so arranged or constructed internally as to provide a series connection for the tubes. These headers, as in the case of the water tubes and of the heating elements, may be readily removed for the purposes of inspection and repair or renewal, as the case may be, without necessitating the destruction of any part of the apparatus.

Another object of my invention is the provision of an electrically operated water heater so constructed and arranged as to adapt the same for the production system of manufacture, owing to the fact that the tubes are of identical construction, as well as the heating elements and the headers, thereby reducing the cost of manufacture to the minimum.

In my improved device I have also provided means for thoroughly heat insulating the apparatus to retain, as far as possible, all the heat generated therein, and I have also so constructed the heating elements employed as to eliminate all danger of charging of the water as it passes through the heater.

In the accompanying drawings,—

Fig. 1 shows an installation of my improved apparatus in more or less diagrammatic form;

Fig. 2 is a sectional side elevation of my improved heater;

Fig. 3 is a view taken substantially on the line 3—3 of Fig. 2;

Fig. 4 is a section on the line 4—4 of Fig. 2; and

Fig. 5 is a section on the line 5—5 of Fig. 2.

Referring to the drawings in detail, my improved heater comprises a plurality of flattened water tubes 1 of high heat conductivity. These tubes are preferably composed of flattened copper tubing. Each one of the water tubes is provided at each end with an annular flange designated 2, welded or otherwise permanently attached to the tubes. The tubes are arranged horizontally and in spaced relation to each other, as plainly indicated in Fig. 2, and each tube is secured for independent removal to headers 3 and 4. These two headers extend vertically of the apparatus across the ends of all the tubes, and each header is a one-piece or unitary structure. The header 3 is provided with water passageways 5, while the header 4 is provided with similar water passageways 6, these water passageways being so located with respect to the tubes and to each other as to connect the water tubes in series. Each header is provided with bosses or columns 7 cast integral therewith, these columns extending from the inner wall to the outer wall of their respective headers. This provides a construction whereby bolts 8 may be passed through the headers and into the flanges 2 on the water tubes without coming in contact with the water passing through the headers. The bolts 8 constitute part of the means for attaching the water tubes to the headers. The additional attaching or securing means is provided by three bolts designated 9 (see Fig. 3), these bolts passing through the headers and into the flanges at one side of the water passageways in the headers. The columns 7 provide solid material between the ports 10 in the headers, which material overlaps or overlies the joints 11 between adjacent flanges 2 on adjacent water tubes to provide a watertight structure.

Interposed between adjacent water tubes and substantially filling this space, are electrically operated heating elements 12. Each one of these heating elements is in the form of a brick-like structure or body portion 13, of electric insulating material, spirally slotted at 14 and wound with conductor tape 15. In order that each heating element may be thoroughly electrically insulated from the water tubes, the slots above the tape are filled with insulating material designated 16. The insulating material employed in these heating elements is preferably alundum, inasmuch as I have found this to be a good electric insulator and yet a material which will retain its heat for a long time, to maintain the water circulating through the water tubes in a heated condition some time after the electric power has been shut off. It is to be understood that each one of these electric heating elements is so mounted as to be removable independently of the others and of the water tubes, so that if it is desired to remove any one of these heating elements for purposes of inspection, repair or replacement, this may readily be done.

The conductors 15 of the heating elements may be connected to each other by the connector arrangement shown at 17 in Fig. 3. It will be understood that these conductors may be connected in series or in multiple, or in any other way electrically, that may be desired.

The headers 3 and 4, as already pointed out, are identical in construction, and the header 4 is provided with an inlet connection 18 while the header 3 is provided with an outlet connection 19. This is the ideal arrangement in a heater of this kind, for the reason that it permits of the cold water being taken in at the bottom of the heater and the hot water to be taken off at the top, to which it will naturally rise.

On the exterior of the headers I provide a heat and electric insulating board or slab 20 extending from top to bottom of the heater and from end to end. At the top of the heater adjacent the uppermost tube 1, I provide an electric and insulating board 21, while a similar board 22 is provided at the bottom of the heater against the lowermost water tube. On the exterior of these two last mentioned members I provide a metal plate, a plate 23 at the top and a plate 24 at the bottom. The plate 23 is flanged and connected to the flanges of the upper water tube and to the headers by a bolt or bolts 25. The lower plate 24 is held in place in a similar manner by bolts 26. This provides, therefore, a unitary, rigid structure consisting of the headers, tubes, heaters and end plates or tie plates. On the exterior of the heater I provide a metal casing, preferably a sectional casing, designated 27, which may readily be removed whenever access is desired to the interior of the heater.

The connector shown at 17 in Fig. 3, by which the conductors of adjacent heating elements are connected to each other, comprises insulating members 28 and 29 arranged in spaced relation to each other and set into one of the boards or slabs of insulation 35. Intermediate these two members is another insulating member 30 recessed at 31 on its outer face. On the outside of this board and of the two members 28 and 29 is another insulator 32 recessed at 33. A connector comprised of two plates is set into the recess between the insulating members 32 and 30. By merely removing the board or slab 35, access may be had to this connector arrangement to disconnect the conductors of adjacent heating elements from each other, or for any other purpose desired.

What I claim is:

1. An electrically operated water heater comprising in combination a plurality of series connected separate flattened water tubes, flanges on the ends of each tube, a header at each end of said tube bolted to said flanges to attach said tubes to said headers for independent removal and to connect said tubes in series, and independently removable electrical heating elements interposed between and adjacent said tubes and electrically insulated therefrom.

2. An electrically operated water heater comprising in combination a plurality of flattened water tubes, flanges secured to the ends of each tube, unitary headers at each end of said tubes and to which said tubes through said flanges are attached to connect said tubes in series for independent removal, and independently removable electrical heating elements interposed between and adjacent said tubes and electrically insulated therefrom.

3. An electrically operated water heater comprising in combination a plurality of horizontally disposed, spaced, separate, water tubes, a header at each end of said tubes arranged to connect the same in series, flanges attached to each end of each tube by which the tubes are connected to the headers for independent removal, and electric heating elements positioned between and adjacent the walls of said tubes and electrically insulated therefrom.

4. In an electrically operated water heater comprising in combination, a pair of vertically extending unitary spaced headers, a plurality of water tubes positioned between said headers, flanges on each end of each tube, each header being provided with water passageways to connect said tubes in series, bolts for attaching said water tubes to said headers for independent removal said bolts passing through the said flanges on the tubes, and electrical heating elements interposed between adjacent tubes and filling the space between said tubes, said electrical heating elements being independently removable.

This specification signed this 13th day of May, 1926.

SAMUEL D. NESMITH.